(12) United States Patent
Sasaki

(10) Patent No.: US 6,212,033 B1
(45) Date of Patent: Apr. 3, 2001

(54) SLIDER AND METHOD FOR MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/272,206

(22) Filed: Mar. 19, 1999

(30) Foreign Application Priority Data

Mar. 31, 1998 (JP) .................................................. 10-086503

(51) Int. Cl.$^7$ ................................ G11B 5/60; G03C 5/00; B44C 1/22
(52) U.S. Cl. ............................ 360/103; 430/320; 216/47
(58) Field of Search ............................ 430/320; 360/103; 216/47

(56) References Cited

U.S. PATENT DOCUMENTS

| | | | |
|---|---|---|---|
| 4,564,585 | | 1/1986 | Blaske et al. . |
| 5,019,930 | * | 5/1991 | Takeya .................................. 360/103 |
| 5,162,073 | * | 11/1992 | Aronoff et al. ...................... 156/625 |
| 5,316,617 | * | 5/1994 | Kawabe et al. ...................... 156/643 |
| 5,329,689 | * | 7/1994 | Azuma et al. .......................... 29/603 |
| 5,675,453 | * | 10/1997 | Matsuzawa et al. ................. 360/103 |
| 5,903,968 | * | 5/1999 | Shouji .............................. 29/603.09 |
| 5,914,202 | * | 6/1999 | Nguyen et al. ........................... 430/5 |
| 5,949,614 | * | 9/1999 | Chhabra ............................... 360/103 |
| 6,004,472 | * | 12/1999 | Dorius et al. .......................... 216/22 |
| 6,055,128 | * | 4/2000 | Dorius et al. ........................ 360/103 |

FOREIGN PATENT DOCUMENTS

B2-5-8488    2/1993  (JP) .

* cited by examiner

*Primary Examiner*—C. H. Kelly
(74) *Attorney, Agent, or Firm*—Oliff & Berridge, PLC

(57) ABSTRACT

The present invention makes it possible to manufacture a slider having two surfaces at different depths relative to a flying surface.

First etching is performed to form a second surface corresponding to a step portion using a photoresist mask; thereafter, another photoresist mask is formed on a region to become a second surface of the slider bar without removing the former photoresist mask; and second etching is performed using those photoresist masks to form a third surface corresponding to a negative pressure generating portion.

12 Claims, 12 Drawing Sheets

US 6,212,033 B1

SLIDER AND METHOD FOR MANUFACTURING THE SAME

BACKGROUND OF THE INVENTION

1. Field of the Invention

The present invention relates to a slider used for a flying magnetic head or the like and a method for manufacturing the same.

2. Description of the Related Art

A flying magnetic head used in a magnetic disc apparatus or the like is configured by forming a thin film magnetic head element at the rear end of a slider. In general, a slider includes rail portions whose surfaces act as flying surfaces (air bearing surfaces) and includes a taper or step portion in an air inflow portion (in the vicinity of the end at the air inflow side) such that the rail portions slightly fly above the surface of a magnetic recording medium such as a magnetic disc by a stream of air flowing in through the tapered or stepped surface.

In general, a slider having a taper portion at an air inflow portion is formed into a predetermined configuration through a mechanical process such as lapping. A slider having a step portion at an air inflow portion thereof (hereinafter referred to as "a step leading type slider") is formed into a predetermined configuration through an etching process utilizing photolithography, for example, as disclosed in Japanese examined patent publication (KOKOKU) No. H5-8488.

A step leading type slider can be accurately formed even into a complicated configuration because it is manufactured using photolithography instead of a mechanical process as described above. This is advantageous in that it facilitates control over flying characteristics and in that processing cost can be reduced.

Recently, a need has arisen for a reduction in the flying amount of a slider for an improved recording density. It is also desired to improve the stability of the flying of a slider in order to achieve access at a higher speed. Negative pressure sliders have been put in use to satisfy such needs. In general, a negative pressure slider is formed with a negative pressure generating portion having a concave configuration to generate a negative pressure between two rail portions. Such a negative pressure slider has a microscopic configuration on a surface thereof facing a recording medium and, especially, the height of the rail portions is significantly smaller than those in conventional sliders.

Such a negative pressure slider of the above-described step leading type, the depths of the step portion and negative pressure generating portion relative to the flying surfaces are different from each other.

A description will now be made with reference to FIG. 12 through FIG. 21 on an example of a method for manufacturing a step leading type negative pressure slider of the related art and on problems with the related-art methods for manufacturing sliders.

It is assumed here that a slider 211 having a configuration as shown in the plan view of FIG. 13 is manufactured. The slider 211 includes two rail portions 212 whose surfaces serve as flying surfaces 212a, a step portion 213 formed at an air inflow portion and a negative pressure generating portion 214 formed to extend from the central portion to the air outflow side thereof. For example, the depth of the step portion 213 relative to the flying surfaces 212a is 1 $\mu$m, and the depth of the negative pressure generating portion 214 relative to the flying surfaces 212a is 3 $\mu$m. The slider 211 includes a thin film magnetic head element 215 provided in a position close to the end at the air outflow side of one of the rail portions 212.

According to the manufacturing method in the related art, the slider bar including a plurality of thin film magnetic head elements arranged in a row is first secured to a jig after lapping of the surfaces thereof to serve as flying surfaces is completed.

The subsequent steps will be described according to the flow chart shown in FIG. 12. First, as shown in FIGS. 14 and 15, a photoresist mask 231 is formed using photolithography on regions 222 of the slider bar 210 to become the rail portions 212 (step S201). FIG. 14 is a plan view showing a region of the slider bar 210 which is to become one slider, and FIG. 15 is an enlarged sectional view taken along the line 15—15 in FIG. 14.

Next, for example, ion milling is performed to etch a region 223 to become the step portion 213 and a region 224 to become the negative pressure generating portion 214 by, for example, 1 $\mu$m using the photoresist mask 231 (step S202).

Next, as shown in FIGS. 16 and 17, the photoresist mask 231 is removed (step S203). FIG. 16 is a plan view similar to FIG. 14, and FIG. 17 is a sectional view similar to FIG. 15.

Next, as shown in FIGS. 18 and 19, a new photoresist mask 232 is formed on the regions 222 to become the rail portions 212 and the region 223 to become the step portion 213 using photolithography (step S204). FIG. 18 is a plan view similar to FIG. 14, and FIG. 19 is a sectional view similar to FIG. 15. Next, for example, ion milling is performed to etch the region 224 to become the negative pressure generating portion 214 by, for example, 2 $\mu$m using the photoresist mask 232 (step S205).

Next, the photoresist mask 232 is removed as shown in FIGS. 20 and 21 (step S206). The slider 211 is thus formed. FIG. 20 is a plan view similar to FIG. 14, and FIG. 21 is a sectional view similar to FIG. 15.

According to the method for manufacturing a slider of the related art as mentioned above, to form the step portion 213 and negative pressure generating portion 214 which are different in depth from each other relative to the flying surface 212a, the series of steps of forming photoresist masks, etching and removing the photoresist mask is repeated twice. Therefore, when the second photoresist mask 232 is formed, the photoresist mask 232 must be positioned accurately especially at the boundaries between the regions 222 to become the rail portions 212 and the region 224 to become the negative pressure generating portion 214.

In practice, however, when the second photoresist mask 232 is formed, it is subjected to a positional shift, for example, in the range from 0.3 to 0.5 $\mu$m attributable to low positioning accuracy of an exposure mask for photolithography and the like as shown in FIGS. 18 and 19.

As a result, steps 241 are formed on side surfaces connecting the flying surfaces 212a and negative pressure generating portion 214 as shown in FIGS. 20 and 21. When such steps 241 is formed, the flying characteristics of the slider 211 will be different from design values, which can cause problems such as a horizontal shift of the slider in use in some cases.

SUMMARY OF THE INVENTION

The present invention has been conceived taking the above-described problems into consideration, and it is an object of the invention to provide a method for manufacturing a slider which makes it possible to accurately manufacture a slider having a first surface to serve as a flying surface (e.g., the flying surface 212a in FIG. 21), a second surface formed in a position at a predetermined first depth (e.g., $D_1$ in FIG. 21) relative to the first surface and a third surface (e.g., the surface of the negative pressure generating portion 214 in FIG. 21) formed in a position at a predetermined second depth (e.g., $D_2$ in FIG. 21) relative to the first surface greater than the first depth.

It is another object of the invention to provide a slider having a first surface to serve as a flying surface, a second surface formed in a position at a predetermined first depth relative to the first surface and a third surface formed in a position at a predetermined second depth relative to the first surface greater than the first depth, wherein designed flying characteristics can be achieved.

A method of manufacturing a slider according to the present invention is a method for manufacturing a slider having a first surface to serve as a flying surface, a second surface formed in a position at a predetermined first depth relative to the first surface and a third surface formed in a position at a predetermined second depth relative to the first surface greater than the first depth, which comprises the steps of:

forming a first etching mask on a region of the material of the slider to become the first surface;

etching the material to a first depth using the first etching mask to form the second surface;

forming a second etching mask on at least the region of the material to become the second surface excluding the region to become third surface without removing the first etching mask;

etching the material further by an amount corresponding to the difference between the second depth and first depth using the first and second etching masks to form the third surface; and removing the first and second etching masks from the material.

According to the method for manufacturing a slider of the present invention, the first and second etching masks are preferably formed using photoresist.

According to the method for manufacturing a slider of the present invention, dry etching is preferably used at the steps of forming the second and third surfaces.

According to the method for manufacturing a slider of the present invention, for example, the second and third surfaces are formed at an air inflow portion and a negative pressure generating portion, respectively. The material may include a thin film magnetic head element.

A slider according to the present invention is a slider having a first surface to serve as a flying surface, a second surface formed in a position at a first depth relative to the first surface and a third surface formed in a position at a second depth relative to the first surface greater than the first depth, wherein a side surface connecting the first and third surfaces is a surface having no step.

In the slider according to the present invention, for example, the second and third surfaces are formed at an air inflow portion and a negative pressure generating portion, respectively. The slider according to the present invention may include a thin film magnetic head element.

Other objects, features and advantages of the present invention will be sufficiently apparent from the following description.

DETAILED DESCRIPTION OF PREFERRED EMBODIMENT

An embodiment of the present invention will now be described with reference to the drawings.

Figure 1:
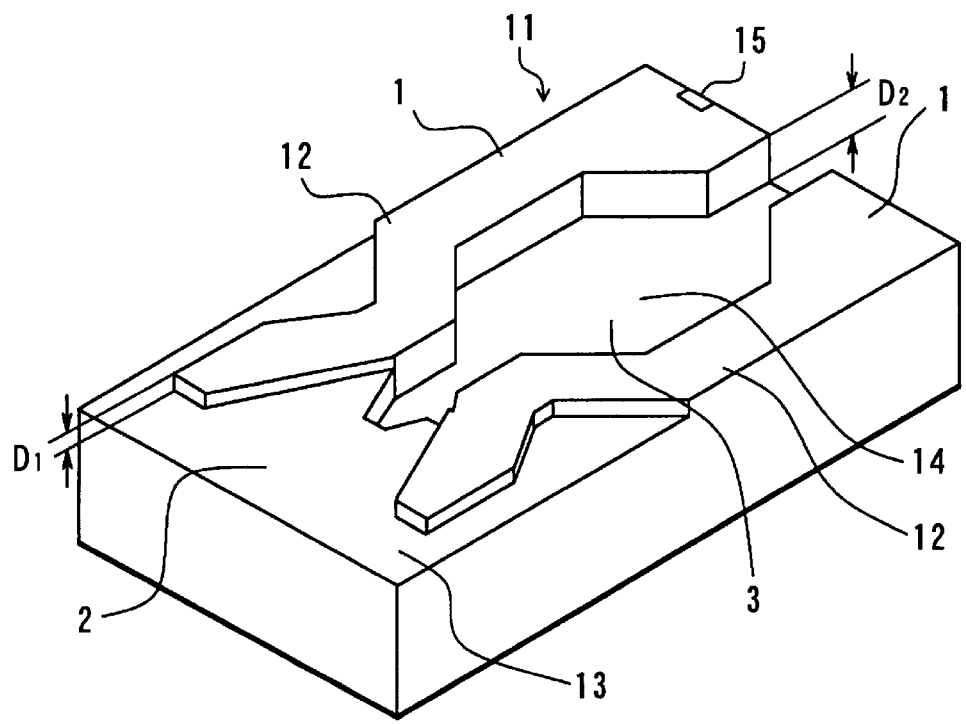
FIG. 1 is a perspective view of a slider according to an embodiment of the present invention.

First, a description will be made on a configuration of a slider according to the present invention with reference to the perspective view in FIG. 1. A slider 11 according to the present embodiment is a step leading type negative pressure slider which is, for example, used for a flying magnetic head element. The slider 11 includes two rail portions 12 whose surfaces are to serve as flying surfaces 1, a step portion 13 formed at an air inflow portion (in the vicinity of the end at an air inflow side thereof) and a negative pressure generating portion 14 formed to extend from the central portion to an air outflow side thereof. For example, the depth $D_1$ of the step portion 13 relative to the flying surfaces 1 is 1 μm, and the depth $D_2$ of the negative pressure generating portion 14 relative to the flying surfaces 1 is 3 μm.

Hereinafter, the flying surfaces are referred to as "first surfaces". The step portion 13 has a second surface 2 formed in a position at a first depth $D_1$ (e.g., 1 μm) relative to the first surfaces 1, and the negative pressure generating portion 14 has a third surface 3 formed in a position at a second depth $D_2$ (e.g., 3 μm) relative to the first surfaces 1 greater than the first depth.

The slider 11 includes a thin film magnetic head element 15 in a position in the vicinity of the end at the air outflow side of one of the rail portions 12.

Figure 2:
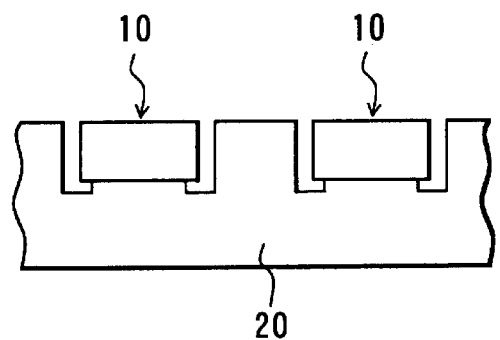
FIG. 2 is a side view showing a state at a step of manufacture of the slider of the embodiment in which slider bars have been secured to a jig.

A method for manufacturing the slider according to the present embodiment will now be described with reference to FIG. 2 through FIG. 11. According to the method for manufacturing the slider of the present embodiment, as shown in FIG. 2, a plurality of slider bars 10 which include a plurality of thin film magnetic head elements arranged in a row and which have been lapped on the surfaces thereof to serve as flying surfaces are first secured to a jig 20 in preparation for steps to be described below. The slider bars 10 correspond to the material to become a slider in the context of the present invention. For example, the slider bars 10 are formed of aluminum oxide and titanium carbide ($Al_2O_3.TiC$).

Figure 3:
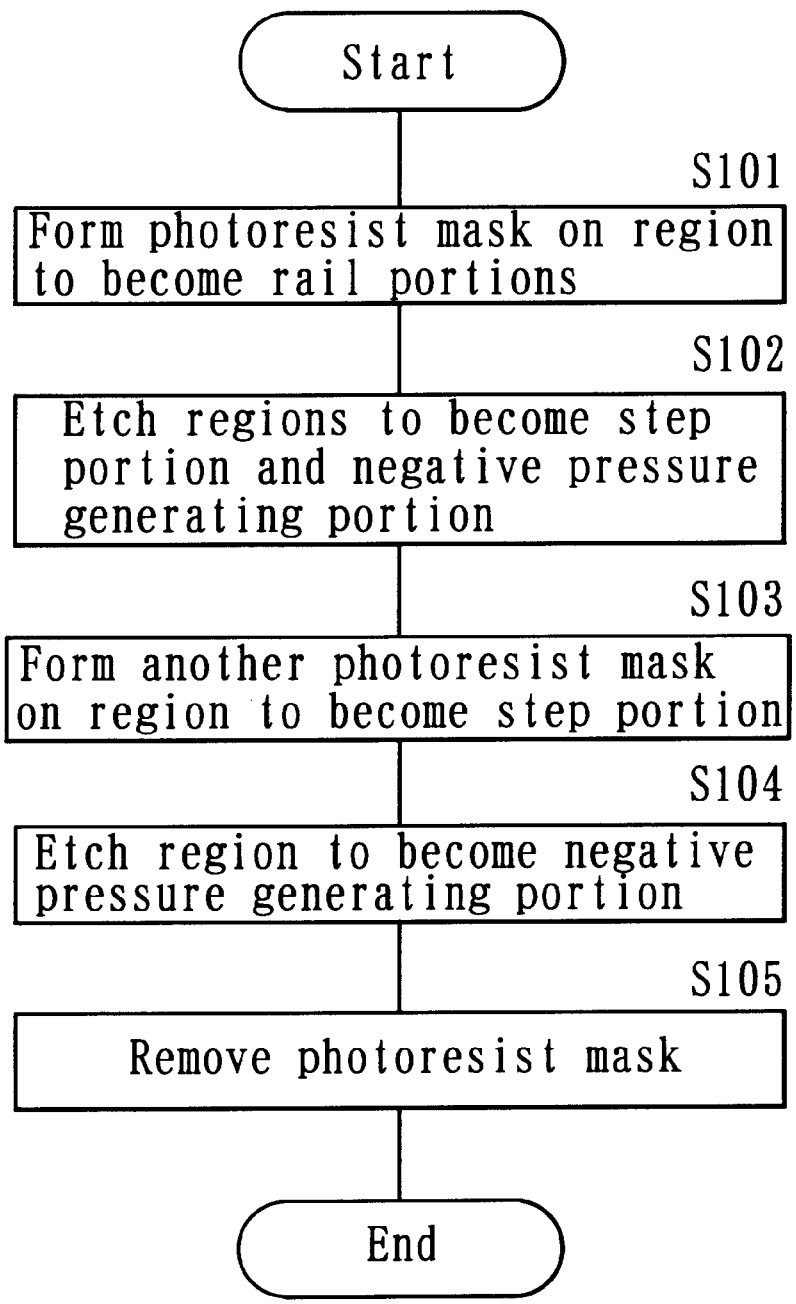
FIG. 3 is a flow chart showing a method for manufacturing the slider of the embodiment.
Figure 4:
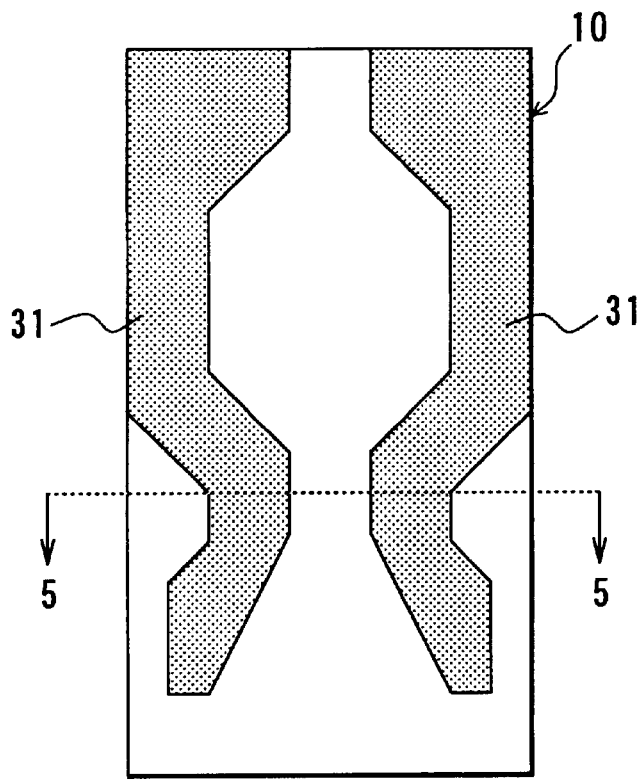
FIG. 4 is a plan view showing a state at a step of manufacture of the slider of the embodiment in which a photoresist mask has been formed on the slider bars.
Figure 5:
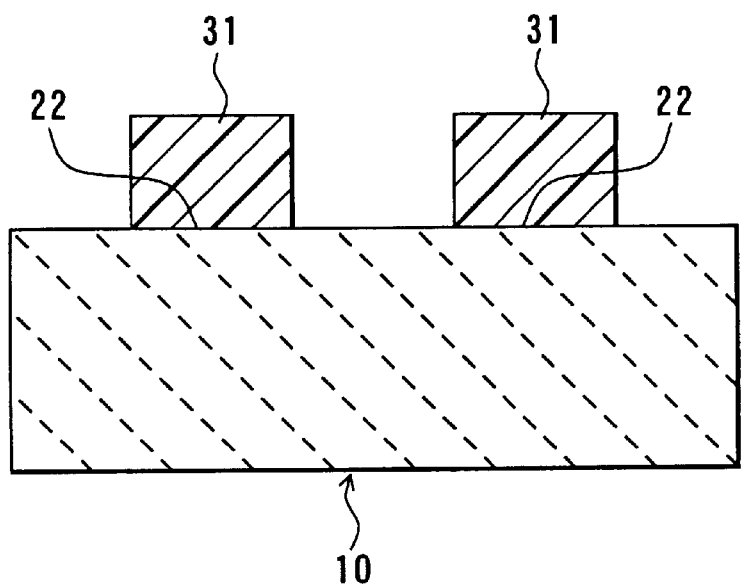
FIG. 5 is an enlarged sectional view taken along the line 5—5 in FIG. 4.

Subsequent steps will now be described according to the flow chart in FIG. 3. As shown in FIGS. 4 and 5, a photoresist mask 31 is first formed using photolithography on regions 22 of the slider bars 10 to become the rail portions 12 (step S101). FIG. 4 is a plan view showing a region of the slider bars 10 to become one slider, and FIG. 5 is an enlarged sectional view taken along the line 5—5 in FIG. 4. The thickness of the photoresist mask 31 is preferably on the order of 20 μm. The photoresist mask 31 corresponds to the first etching mask of the present invention.

The step of forming the photoresist mask 31 is specifically carried out as follows. First, a photoresist layer is formed on the entire surface of the slider bar 10 including the regions 22 to become the rail portions 12. For example, one method for forming the photoresist layer is to bond a dry film made of a photoresist material on using thermal compression. Then, the photoresist layer is exposed using an exposure mask and is developed to form the photoresist mask 31 in a predetermined pattern. For example, a negative type photoresist layer is used, and the exposure mask in this case has openings in a configuration corresponding to the rail portions 12.

Figure 6:
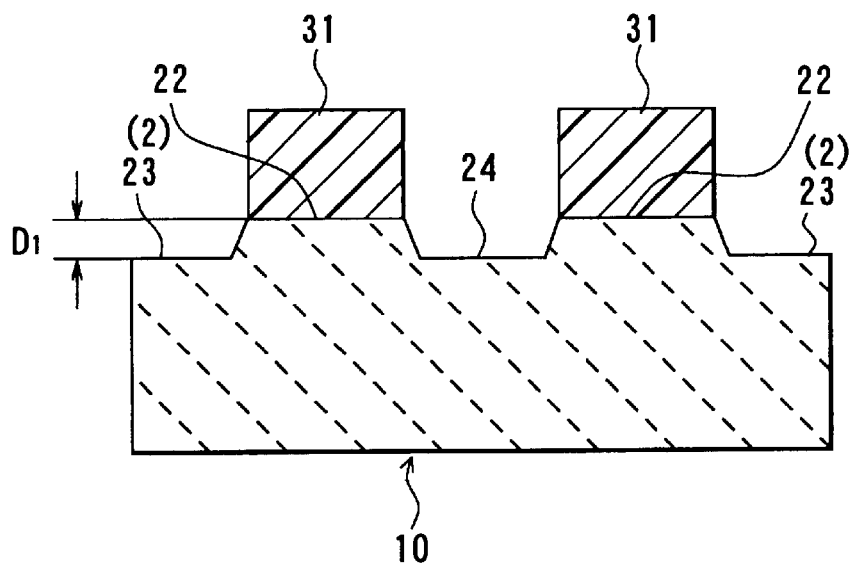
FIG. 6 is a sectional view showing a state at a step of manufacture of the slider of the embodiment in which first etching has been carried out.

Next, as shown in FIG. 6, a region 23 to become the step portion 13 and a region 24 to become the negative pressure generating portion 14 are etched using the photoresist mask 31 to a predetermined depth $D_1$, e.g., 1 μm to form the second surface 2 on the region 23 to become the step portion 13 (step S102). FIG. 6 is a sectional view similar to FIG. 5. For this etching, dry etching such as reactive ion etching or ion milling is preferably used which allows microscopic features to be formed accurately.

Figure 7:
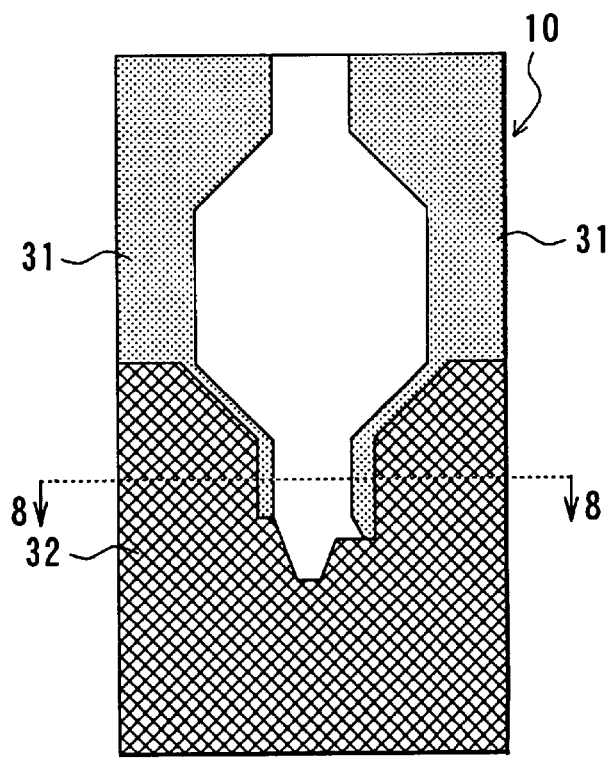
FIG. 7 is a plan view showing a state in which another photoresist mask has been formed in the state shown in FIG. 6.
Figure 8:
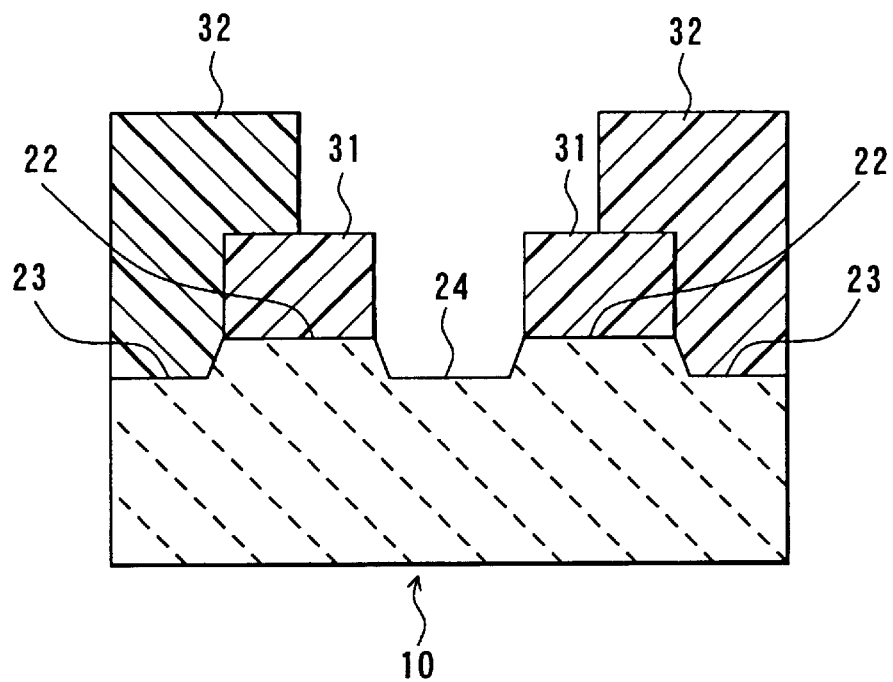
FIG. 8 is an enlarged sectional view taken along the line 8—8 in FIG. 7.

Next, as shown in FIGS. 7 and 8, another photoresist mask 32 is formed using photolithography at least on the region 23 of the slider bar 10 to become the step portion 13 (second surface 2) excluding the region 24 to become the negative pressure generating portion 14 without removing the photoresist mask 31 (step S103). FIG. 7 is a plan view similar to FIG. 4, and FIG. 8 is an enlarged sectional view taken along the line 8—8 in FIG. 7. The photoresist mask 32 may extend on a part of the photoresist mask 31. The thickness of the photoresist mask 32 is preferably in the range from about 10 to 20 μm. The photoresist mask 32 corresponds to the second etching mask of the present invention. The details of the step of forming the photoresist mask 32 are similar to the step of forming the photoresist mask 31.

Figure 9:
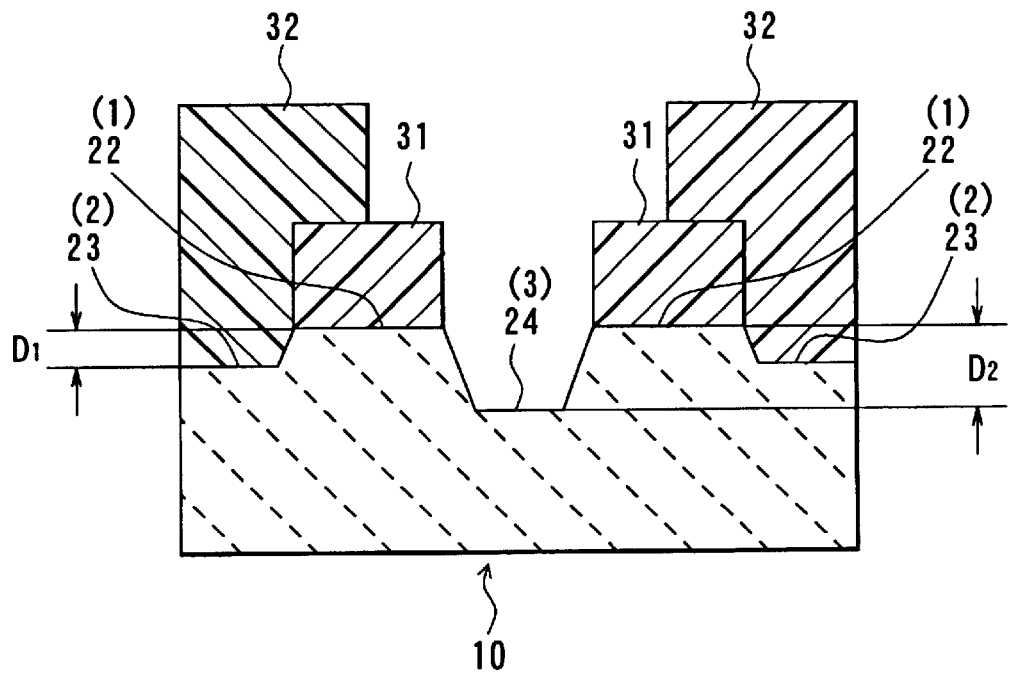
FIG. 9 is a sectional view showing a state at a step of manufacture of the slider of the embodiment in which second etching has been carried out.

Next, as shown in FIG. 9, the region 24 to become the negative pressure generating portion 14 is etched using the photoresist masks 31 and 32 by an amount corresponding to the difference between the second depth $D_2$ and first depth $D_1$, e.g., 2 μm, to form the third surface 3 on the region 24 to become the negative pressure generating portion 14 (step S104). FIG. 9 is a sectional view similar to FIG. 8. For this etching, dry etching such as reactive ion etching or ion milling is preferably used which allows microscopic features to be formed accurately.

Figure 10:
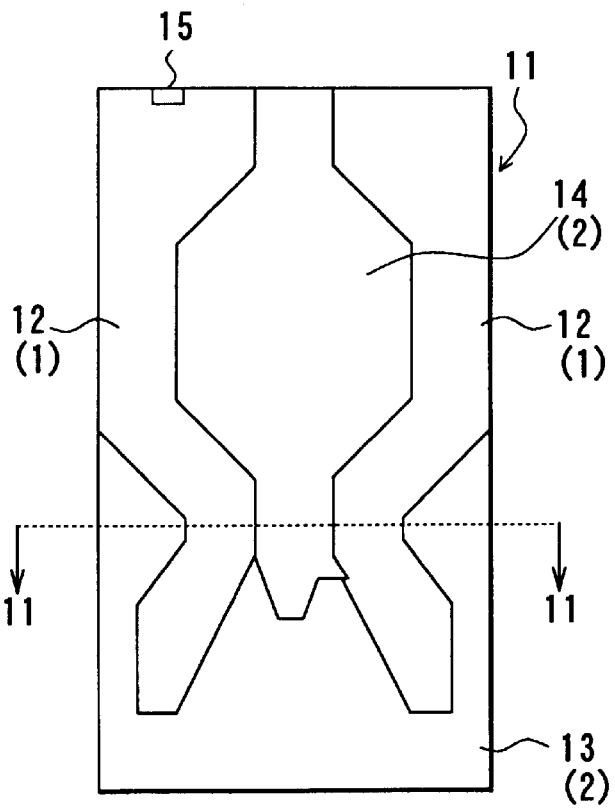
FIG. 10 is a plan view showing a state at a step of manufacture of the slider of the embodiment in which the photoresist masks have been removed.
Figure 11:
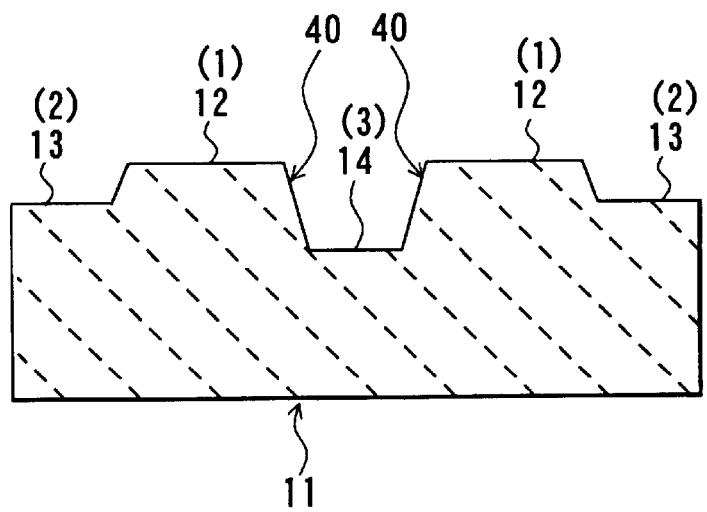
FIG. 11 is an enlarged sectional view taken along the line 11—11 in FIG. 10.
Figure 12:
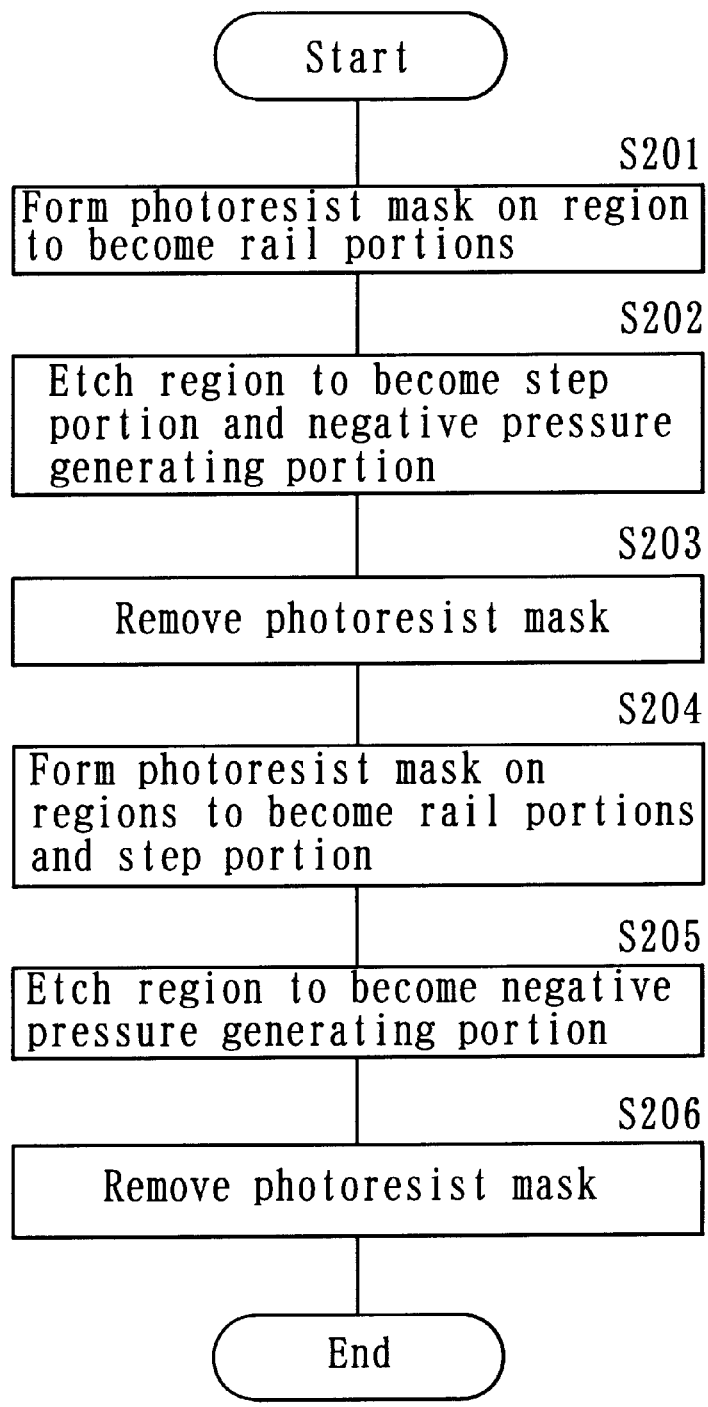
FIG. 12 is a flow chart showing an example of a method for manufacturing a slider according to the related art.
Figure 13:
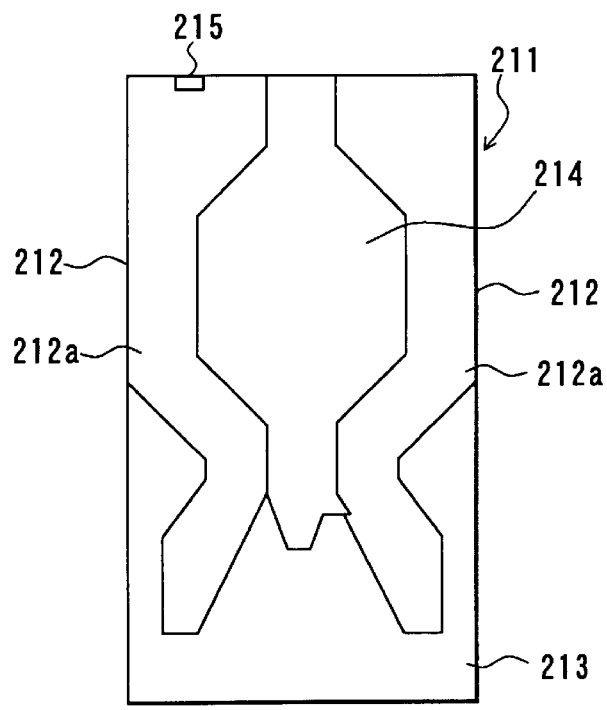
FIG. 13 is a plan view showing an example of a slider according to the related art.
Figure 14:
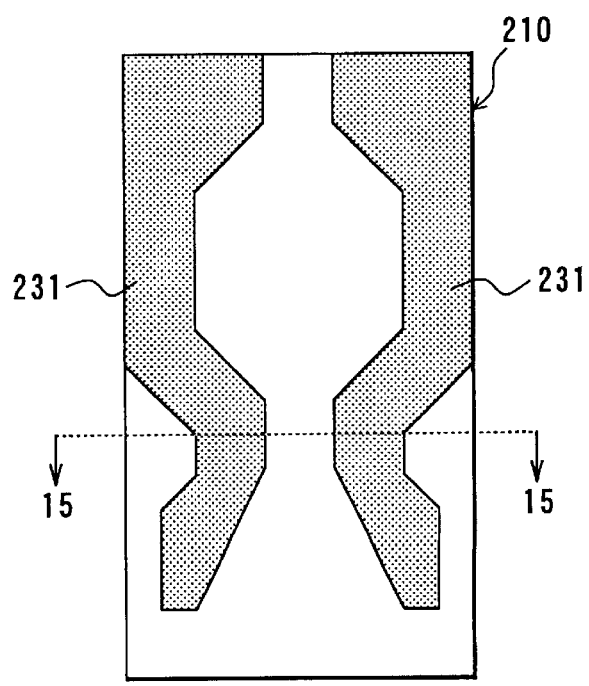
FIG. 14 is a plan view showing a state at a step of manufacture of the slider of the related art in which first etching has been carried out.
Figure 15:
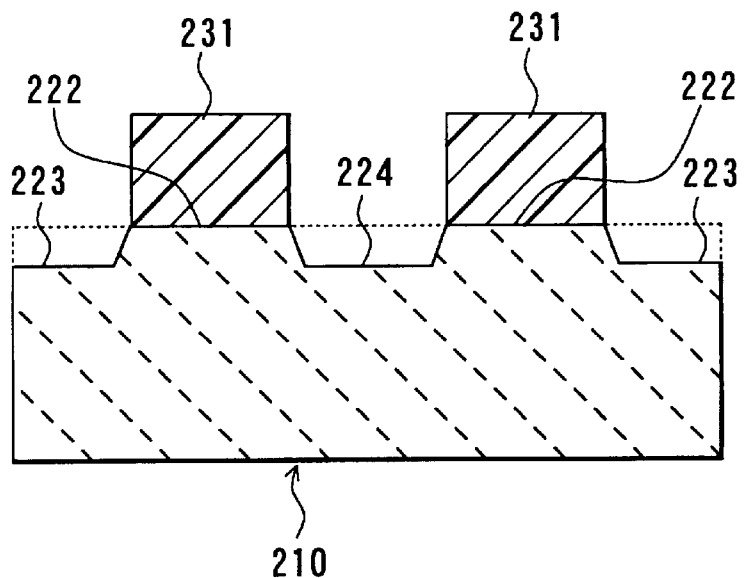
FIG. 15 is an enlarged sectional view taken along the line 15—15 in FIG. 14.
Figure 16:
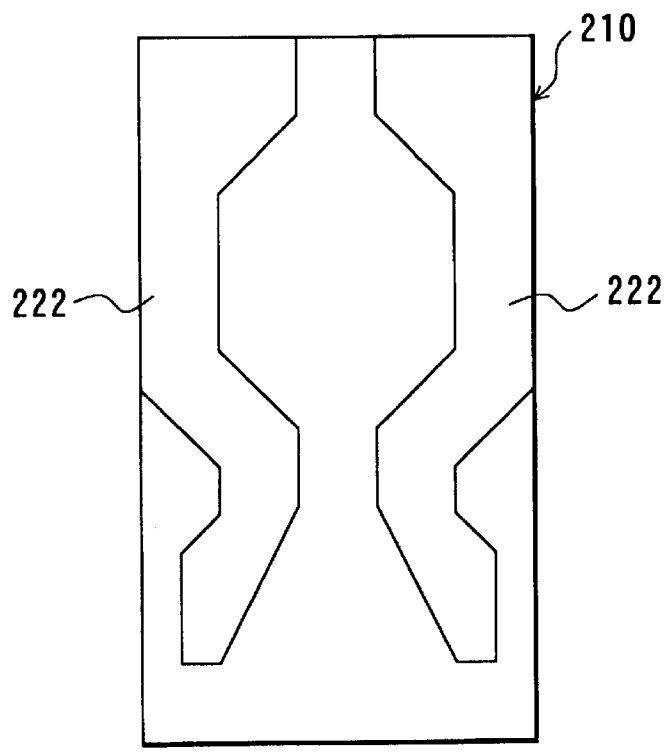
FIG. 16 is a plan view showing a state at a step of manufacture of the slider of the related art in which the photoresist mask has been removed.
Figure 17:
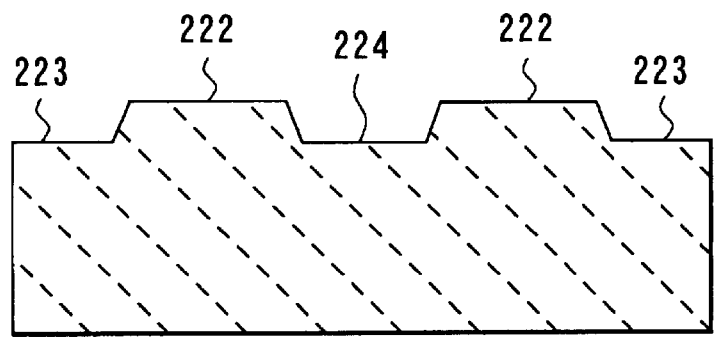
FIG. 17 is a sectional view showing a state similar to that in FIG. 16.
Figure 18:
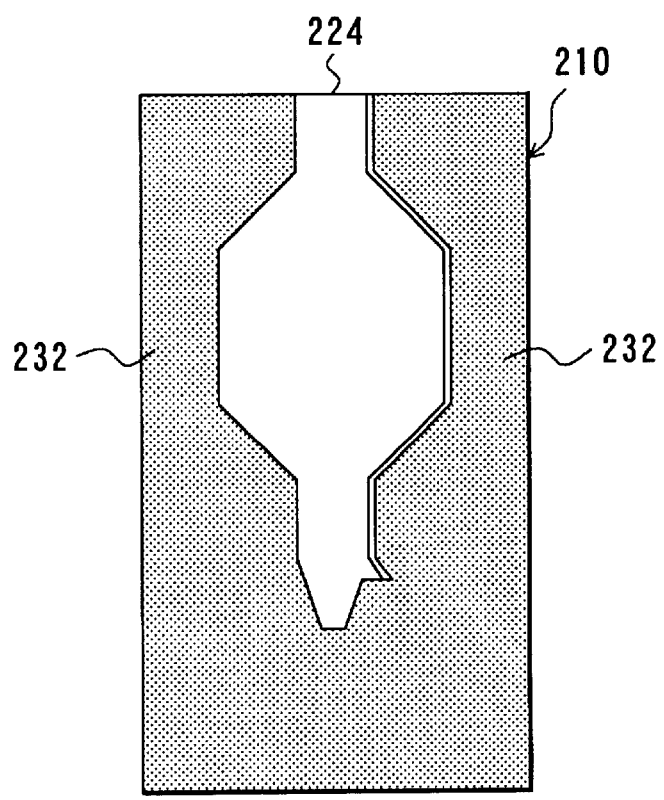
FIG. 18 is a plan view showing a state at a step of manufacture of the slider of the related art in which a second photoresist mask has been formed.
Figure 19:
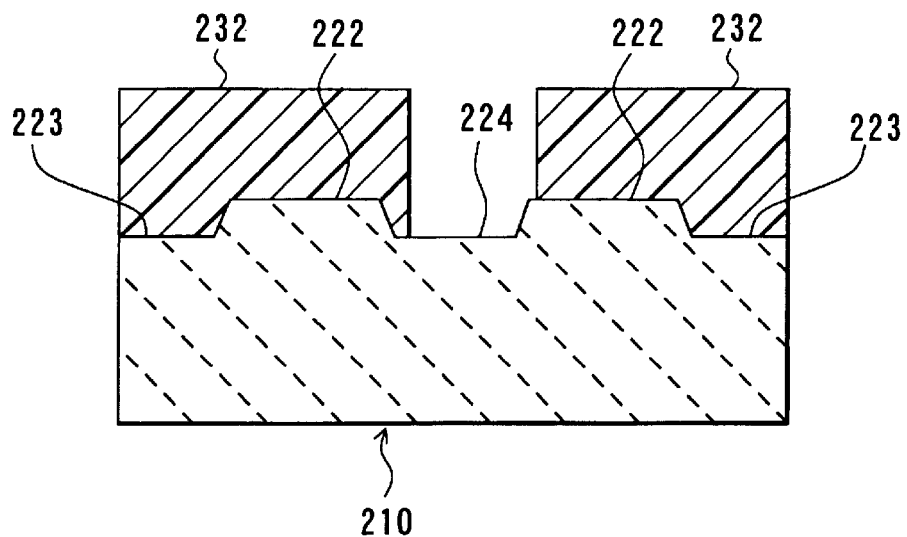
FIG. 19 is a sectional view showing a state similar to that in FIG. 18.
Figure 20:
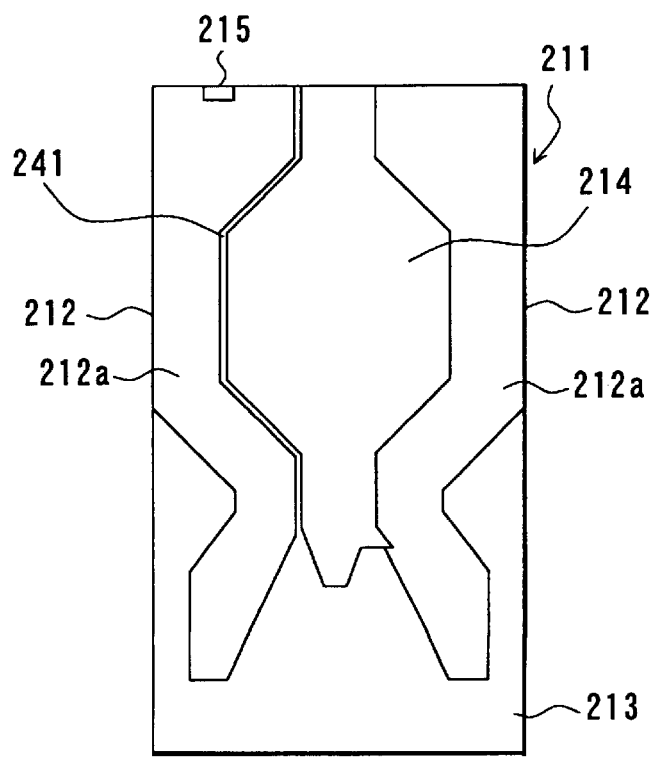
FIG. 20 is a plan view showing a state at a step of manufacture of the slider of the related art in which second etching has been carried out.
Figure 21:
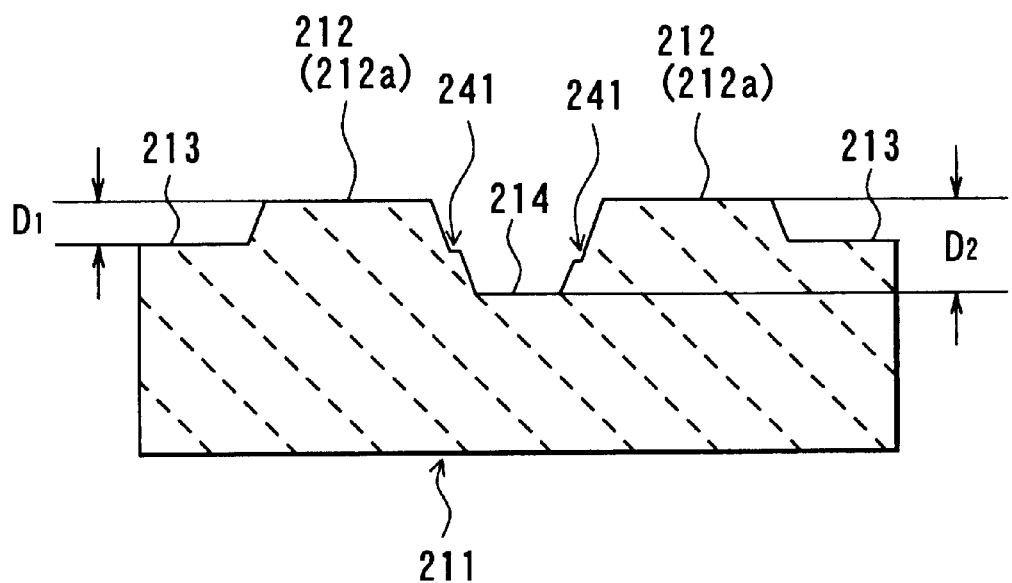
FIG. 21 is a sectional view showing a state similar to that in FIG. 20.

Next, as shown in FIGS. 10 and 11, the slider bar 10 is removed from the jig 20 and, thereafter, the photoresist masks 31 and 32 are removed (step S105). FIG. 10 is a plan view similar to FIG. 4, and FIG. 11 is an enlarged sectional view taken along the line 11—11 in FIG. 10. As a result, the slider bar 10 is obtained which is a multiplicity of sliders 11 in the configuration shown in FIG. 1 connected together. Thereafter, the slider bar 10 is cut into the sliders 11 having the configuration shown in FIG. 1.

As described above, according to the method for manufacturing a slider of the present embodiment, first etching is performed to form the second surface 2 using the photoresist mask 31; thereafter, the other photoresist mask 32 is formed at least on the region 23 of the slider bar 10 to become the step portion 13 (second surface 2) excluding the region 24 to become the negative pressure generating portion 14 without removing the photoresist mask 31; and second etching is performed using the photoresist masks 31 and 32 to form the third surface 3. Therefore, as shown in FIG. 9, the photoresist mask 31 for the first etching serves as an etching mask for defining the boundary between the first surface 1 and third surface 3 during the second etching. That is, the same photoresist mask 31 is used for the first and second etching at the boundary between the first surface 1 and third surface 3. In other words, the second etching is carried out on a self-alignment basis at the boundary between the first surface 1 and third surface 3. Therefore, as shown in FIG. 11, the method for manufacturing a slider according to the present embodiment makes it possible to prevent the formation of a step on side surfaces 40 which connect the first surface 1 and third surface 3 to manufacture the slider 11 with high accuracy.

Further, the method for manufacturing a slider according to the present embodiment allows a reduction in the number of steps because it is not required to perform the step of removing the photoresist mask 31 prior to the second etching.

Further, in a slider 11 according to the present embodiment manufactured as above, the side surfaces 40 connecting the first surface 1 and third surface 3 are surfaces having no step as shown in FIG. 11. Therefore, a slider 11 according to the present embodiment can achieve intended flying characteristics when it is designed as a slider 11 with side surfaces 40 having no step.

The present invention is not limited to the above-described embodiment. For example, although the embodiment has employed photoresist masks as etching masks, this is not limiting and metal masks may be used as the etching masks. However, photoresist masks are preferably used as in the embodiment because the use of metal masks results in the addition of a photolithographic step to form the metal masks.

Conditions such as etching time and pressure for the dry etching used in the present invention may be set in accordance with desired depths. Referring to the gas used for etching, $Ar+CF_4$, $Ar+BCl_3$, $BCl_3+Cl_2$, Ar or the like may be used for reactive ion etching, and Ar or the like may be used for ion milling.

Although the embodiment has referred to an example of a negative pressure slider, the present invention may be applied to sliders in which no negative pressure is generated.

While the embodiment has referred to an example of a slider for a magnetic head, the present invention may be applied to sliders for other purposes, e.g., a slider for a head (pick-up) for recording or reproduction of information on an optical recording or magneto-optical recording basis.

As described above, according to the method for manufacturing a slider of the present invention, a slider is manufactured which has a first surface to serve as a flying surface, a second surface formed in a position at a predetermined first depth relative to the first surface and a third surface formed in a position at a predetermined second depth relative to the first surface greater than the first depth by forming a first etching mask in a region on the material of the slider to become the first surface, etching the material to the first depth using the first etching mask to form the second surface, forming a second etching mask at least on a region of the material to become the second surface excluding a region to become the third surface without removing the first etching mask; etching the material further using the first and second etching masks by an amount corresponding to the difference between the second and first depths to form the third surface; and removing the first and second etching masks from the material. As a result, no step is formed on side surfaces connecting the first and third surfaces during the second etching to provide an advantage in that a slider can be manufactured with high accuracy.

The method for manufacturing a slider according to another mode of the present invention is advantageous in that a slider can be manufactured with a smaller number of steps because the first etching mask is formed by photoresist.

The method for manufacturing a slider according to still another mode of the present invention is advantageous in that a slider can be manufactured with a smaller number of steps because the second etching mask is formed by photoresist.

The method for manufacturing a slider according to still another mode of the present invention is advantageous in that a slider can be manufactured especially accurately because dry etching is used for the step of forming the second surface.

The method for manufacturing a slider according to still another mode of the present invention is advantageous in that a slider can be manufactured especially accurately because dry etching is used for the step of forming the third surface.

According to the present invention, there is provided a slider having a first surface to serve as a flying surface, a second surface formed in a position at a predetermined first depth relative to the first surface and a third surface formed in a position at a predetermined second depth relative to the first surface greater than the first depth, which is advantageous in that flying characteristics intended by design can be achieved because side surfaces connecting the first and third surfaces are surfaces having no step.

It is apparent that various embodiments and modifications of the present invention are possible based on the above description. Therefore, the present invention can be embodied in modes other than those in the above detailed description within the scope of equivalence of the appended claims.

What is claimed is:

1. A method for manufacturing a slider having a first surface to serve as a flying surface, a second surface formed in a position at a predetermined first depth relative to said first surface, a third surface formed in a position at a predetermined second depth relative to said first surface greater than said first depth, and a side surface connecting said first surface and said third surface, the side surface having no step, the method comprising the steps of:
   forming a first etching mask on a region of the material of the slider to become said first surface;
   etching said material to said first depth using said first etching mask to form said second surface;
   forming a second etching mask at least on a region of said material to become said second surface excluding a region to become said third surface without removing said first etching mask;
   etching said material further using said first and second etching masks by an amount corresponding to the difference between said second and first depths to form said third surface; and
   removing said first and second etching masks from said material.

2. A method for manufacturing a slider according to claim 1, wherein said first etching mask is formed by photoresist.

3. A method for manufacturing a slider according to claim 1, wherein said second etching mask is formed by photoresist.

4. A method for manufacturing a slider according to claim 1, wherein the step of forming said second surface employs dry etching.

5. A method for manufacturing a slider according to claim 1, wherein the step of forming said third surface employs dry etching.

6. A method for manufacturing a slider according to claim 1, wherein said second surface is formed at an air inflow portion.

7. A method for manufacturing a slider according claim 1, wherein said third surface is formed at a negative pressure generating portion.

8. A method for manufacturing a slider according to claim 1, wherein said material includes a thin film magnetic head element.

9. A slider having a first surface to serve as a flying surface, a second surface formed in a position at a predetermined first depth relative to said first surface, a third surface formed in a position at a predetermined second depth relative to said first surface greater than said first depth, and a side surface connecting said first surface and said third surface, the side surface having no step, the slider produced by a method comprising the steps of:
   forming a first etching mask on a region of the material of the slider to become said first surface;
   etching said material to said first depth using said first etchings mask to form said second surface;
   forming a second etching mask at least on a region of said material to become said second surface excluding a region to become said third surface without removing said first etching mask;
   etching said material further using said first and second etching masks by an amount corresponding to the difference between said second and first depths to form said third surface; and
   removing said first and second etching masks from said material.

10. A slider according to claim 9, wherein said second surface is formed at an air inflow portion.

11. A slider according to claim 9, wherein said third surface is formed at a negative pressure generating portion.

12. A slider according to claim 9, which includes a thin film magnetic head element.

* * * * *